United States Patent
Wang et al.

(10) Patent No.: US 11,313,953 B2
(45) Date of Patent: Apr. 26, 2022

(54) DISTANCE MEASURING MODULE

(71) Applicants: Sintai Optical (Shenzhen) Co., Ltd., Guandong Province (CN); Asia Optical Co., Inc., Taichung (TW)

(72) Inventors: Ching-Shiang Wang, Taichung (TW); Chiao-Wen Chang, Taichung (TW)

(73) Assignees: SINTAI OPTICAL (SHENZHEN) CO., LTD., Shenzhen (CN); ASIA OPTICAL CO., INC., Taichung (TW)

( * ) Notice: Subject to any disclaimer, the term of this patent is extended or adjusted under 35 U.S.C. 154(b) by 944 days.

(21) Appl. No.: 16/045,806

(22) Filed: Jul. 26, 2018

(65) Prior Publication Data
US 2019/0041499 A1 Feb. 7, 2019

(30) Foreign Application Priority Data
Aug. 7, 2017 (CN) .......................... 201710665758.0

(51) Int. Cl.
*G01S 7/481* (2006.01)
*G01S 17/08* (2006.01)
*G01S 17/42* (2006.01)

(52) U.S. Cl.
CPC .......... *G01S 7/4817* (2013.01); *G01S 7/4811* (2013.01); *G01S 17/08* (2013.01); *G01S 17/42* (2013.01)

(58) Field of Classification Search
CPC ...... G01S 7/4817; G01S 7/4811; G01S 17/08; G01S 17/42; G02B 26/105; G02B 26/0833; G02B 26/0858
See application file for complete search history.

(56) References Cited

U.S. PATENT DOCUMENTS

| | | | |
|---|---|---|---|
| 9,157,790 B2* | 10/2015 | Shpunt | G01S 17/42 |
| 9,835,853 B1* | 12/2017 | Shpunt | G01S 7/4817 |
| 2002/0092963 A1* | 7/2002 | Domash | G01J 1/20 250/201.1 |
| 2009/0147239 A1* | 6/2009 | Zhu | G01S 7/4812 356/3.12 |
| 2013/0206967 A1* | 8/2013 | Shpunt | G01S 17/10 250/216 |
| 2015/0185313 A1* | 7/2015 | Zhu | G01S 7/4812 356/5.01 |
| 2016/0047895 A1* | 2/2016 | Dussan | G01S 7/4817 356/4.01 |
| 2017/0038581 A1* | 2/2017 | Gilboa | G02B 27/0031 |

(Continued)

*Primary Examiner* — Yuqing Xiao
*Assistant Examiner* — Amanda J Webster
(74) *Attorney, Agent, or Firm* — McClure, Qualey & Rodack, LLP

(57) ABSTRACT

A distance measuring module includes a light emitter, a reflecting unit and a light receiver. The light emitter is configured to emit first light, wherein an object reflects the first light to form second light. The reflecting unit is configured to perform a movement to reflect the first light or the second light. The light receiver is configured to receive the second light for calculating a distance between the distance measuring module and the object. An axis is oriented at a first angle or a second angle with respect to a baseline when the reflecting unit is performing the movement. When the axis is oriented at the first angle, the first light is reflected to the object by the reflecting unit. When the axis is oriented at the second angle, the second light is reflected to the light receiver by the reflecting unit.

17 Claims, 6 Drawing Sheets

(56) References Cited

U.S. PATENT DOCUMENTS

2017/0223249 A1* 8/2017 Tillotson ................. G02B 23/12
2018/0054610 A1* 2/2018 Shpunt .................... G01S 17/89
2018/0143490 A1* 5/2018 Wakabayashi ....... G03B 21/006
2018/0329035 A1* 11/2018 Pacala ..................... G01S 7/486

* cited by examiner

DISTANCE MEASURING MODULE

BACKGROUND OF THE INVENTION

Field of the Invention

The invention relates to a distance measuring module, and more particularly to a distance measuring module having a MEMS (Micro Electro Mechanical System) mirror disposed at an intersection of the optical emitting path and the optical receiving path.

Description of the Related Art

Referring to FIG. 1, a prior distance measuring apparatus 1 includes a telephoto lens system 15, a receiving system 11 and an emitting system 13. The telephoto lens system 15 includes an objective unit 3, a prism unit 5, a display unit 9 and an eyepiece unit 7. In operation, visible light emitted by an object (not shown) enters the telephoto lens system 15 through the objective unit 3 and passes through the prism unit 5 to form an image on the display unit 9 so that a user can observe the object through the eyepiece unit 7. Meanwhile, the emitting system 13 emits a laser beam to the object, and the laser beam is reflected to the receiving system 11 by the object. The receiving system 11 receives the laser beam and outputs a signal to a processor (not shown) for calculating a distance between the distance measuring apparatus 1 and the object, and the distance information is displayed by the display unit 9 for user's reference.

The prior distance measuring apparatus 1 is constituted by at least two systems (the receiving system 11 and the emitting system 13) which cause two issues: (1) large volume and (2) plenty of components (or high cost).

BRIEF SUMMARY OF THE INVENTION

The invention provides a distance measuring module in which the receiving system and the emitting system are integrated with each other by use of a MEMS (Micro Electro Mechanical System) mirror to substitutes some optical components so as to effectively reduce the volume of the distance measuring module.

The distance measuring module in accordance with an embodiment of the invention includes a light emitter, a reflecting unit and a light receiver. The light emitter is configured to emit first light, wherein an object reflects the first light to form second light. The reflecting unit is configured to perform a movement to reflect the first light or the second light. The light receiver is configured to receive the second light for calculating a distance between the distance measuring module and the object. A baseline passes through the object and the reflecting unit, an axis passes through the reflecting unit, and the axis is oriented at a first angle or a second angle with respect to the baseline when the reflecting unit performs the movement. When the light emitter emits the first light, the axis is oriented at the first angle with respect to the baseline so that the first light is reflected by the reflecting unit along the baseline to the object. When the second light from the object is directed to the distance measuring module, the axis is oriented at the second angle with respect to the baseline so that the second light travels along the baseline to the reflecting unit, and is reflected to the light receiver by the reflecting unit.

In another embodiment, the distance measuring module further includes a lens, which includes a light penetrating portion. The first light travels along the baseline, through the light penetrating portion and to the object. The second light travels along the baseline, through the light penetrating portion and to the reflecting unit.

In yet another embodiment, the light penetrating portion is configured to focus light.

In another embodiment, the lens further includes a reflecting portion disposed around the light penetrating portion. The first light is sequentially reflected by the reflecting portion and the reflecting unit to the object. The second light is sequentially reflected by the reflecting unit and the reflecting portion to the light receiver.

In yet another embodiment, a sum of the first angle and the second angle substantially equals to a penetrable angle of the light penetrating portion.

In another embodiment, the sum of the first angle and the second angle ranges from 87.4 degrees to 96.6 degrees.

In yet another embodiment, the first angle ranges from 0 degrees to 46 degrees.

In another embodiment, the distance measuring module further includes a processing unit connected to the light emitter, the reflecting unit and the light receiver. The processing unit is configured to control the light emitter to repeatedly emit the first light at a first frequency. The processing unit is configured to control the reflecting unit to repeatedly perform the movement at a second frequency so that the axis is oriented at the first angle or the second angle with respect to the baseline. The light receiver is configured to receive the second light and output a first signal to the processing unit, and the processing unit is configured to receive the first signal and calculate the distance between the distance measuring module and the object.

In yet another embodiment, the first frequency is at least twice of the second frequency.

In another embodiment, the first frequency is at least two to twenty times of the second frequency.

In yet another embodiment, the light emitter repeatedly emits the first light at the first frequency ranging from 2,500 Hz to 200,000 Hz.

In another embodiment, the first light or the second light is invisible light.

In yet another embodiment, the distance measuring module further includes an optical sensor configured to receive third light travelling from the object to the distance measuring module. When the third light travels from the object to the distance measuring module, the axis is oriented at a third angle with respect to the baseline so that the third light travels along the baseline and to the reflecting unit, and is reflected to the optical sensor by the reflecting unit.

In another embodiment, the third light is visible light.

In yet another embodiment, the reflecting unit is a MEMS (Micro Electro Mechanical System) mirror.

In another embodiment, the third light is invisible light.

In yet another embodiment, the third light is infrared light.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
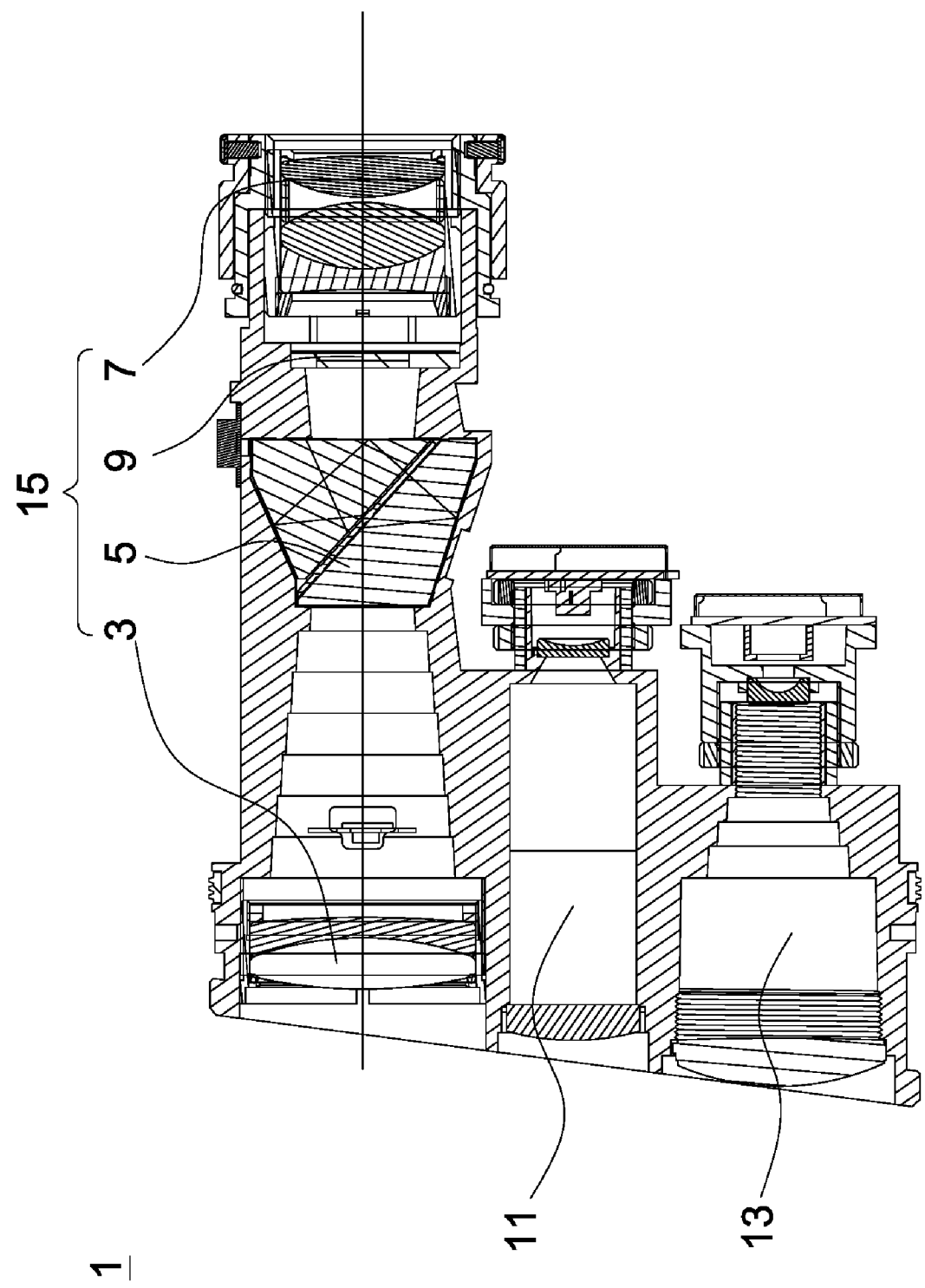
FIG. 1 is a sectional view of a prior distance measuring apparatus.
Figure 2:
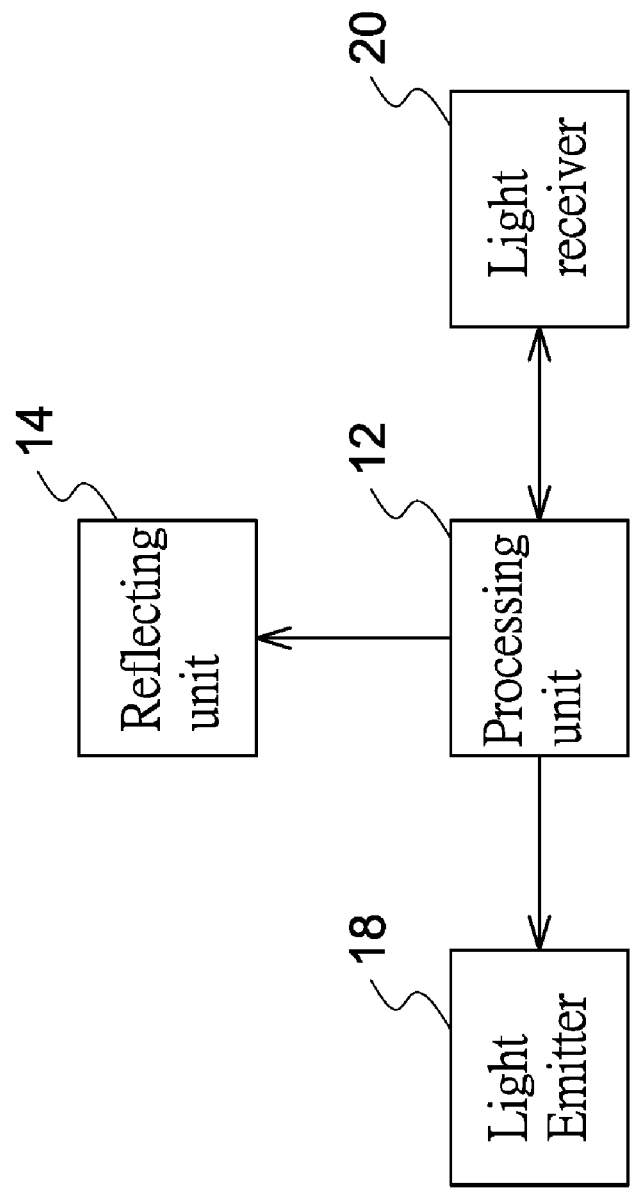
FIG. 2 is a block diagram of a distance measuring module in accordance with a first embodiment of the invention.
Figure 3A:
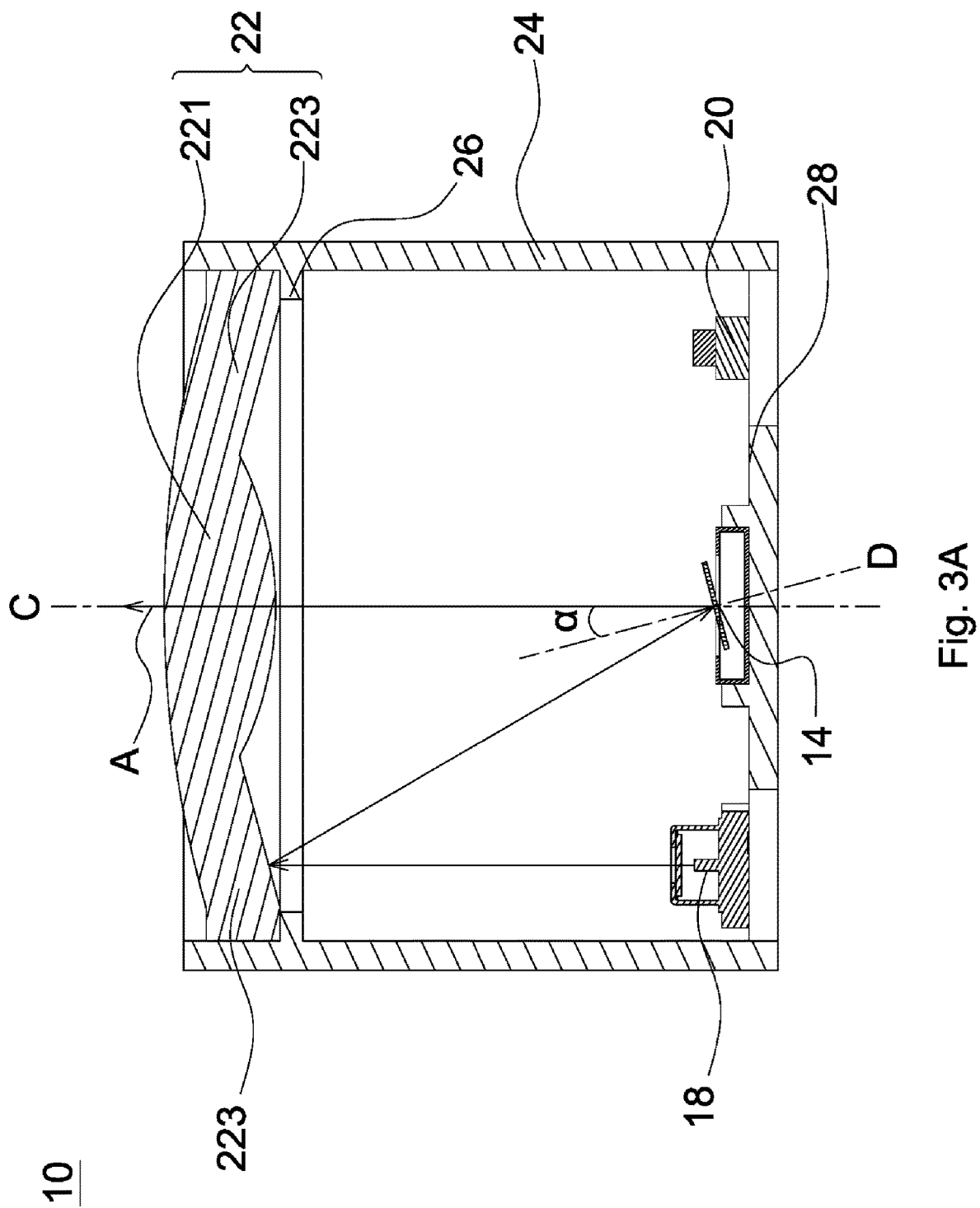
FIG. 3A is a sectional view of a distance measuring module in accordance with the first embodiment of the invention.
Figure 3B:
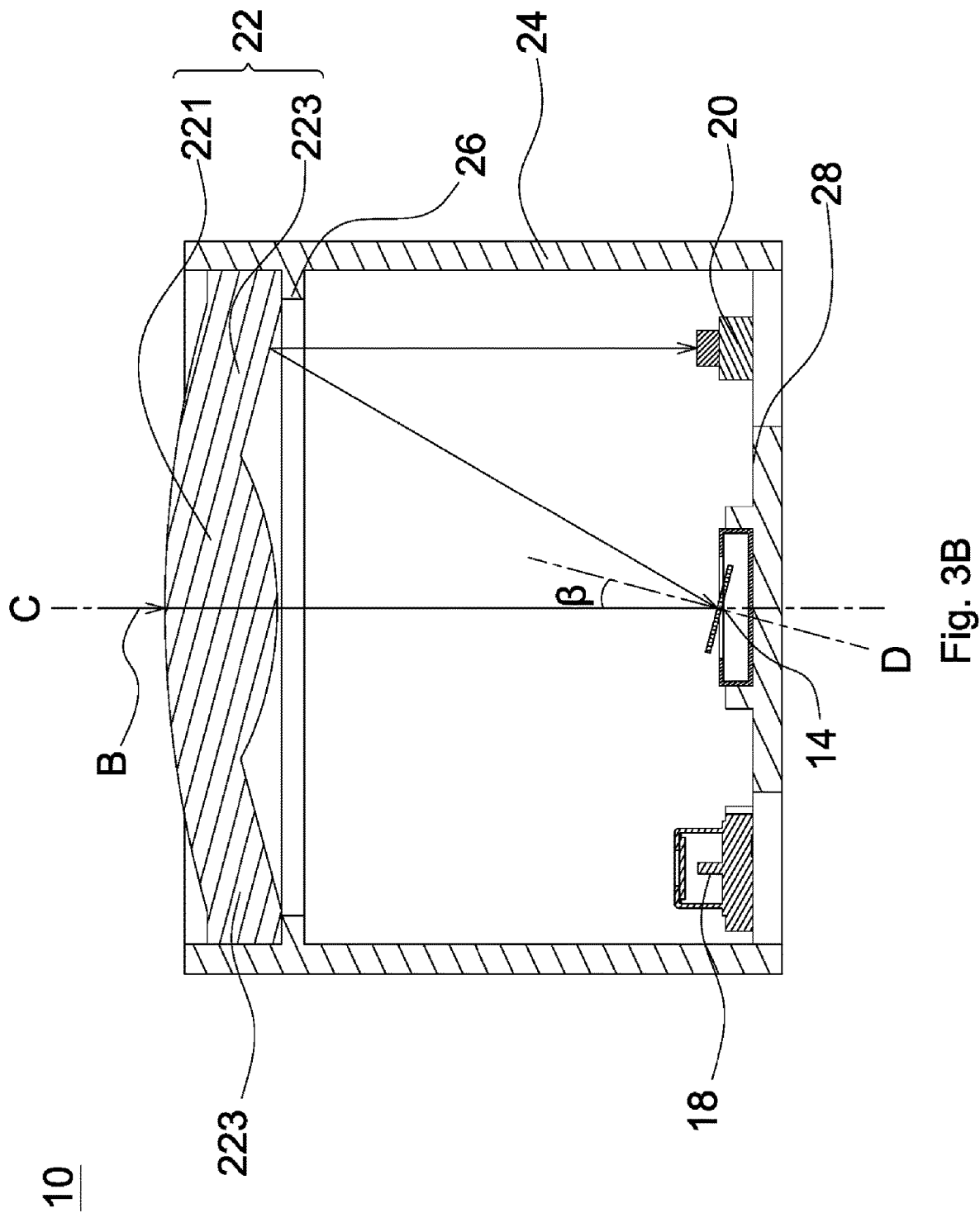
FIG. 3B is a sectional view of the distance measuring module of the FIG. 3A receiving second light.

Referring to FIG. 2, a distance measuring module 10 in accordance with a first embodiment of the invention includes a processing unit 12, a reflecting unit 14, a light emitter 18, a light receiver 20 and a lens 22 (as shown in FIGS. 3A and 3B).

Referring to FIGS. 3A and 3B, in present embodiment, the reflecting unit 14, the light emitter 18 and the light receiver 20 are disposed on a plane 28 of a housing 24, and the lens 22 is disposed on a flange 26 of the housing 24. The processing unit 12 is connected to the reflecting unit 14, the light emitter 18 and the light receiver 20. As shown in FIG. 3A, the light emitter 18 is controlled by the processing unit 12 to repeatedly emit first light A at a first frequency. An object (not shown) reflects the first light A to form second light B. As shown in FIG. 3B, the light receiver 20 is configured to receive the second light B so that the processing unit 12 can calculate a distance between the distance measuring module 10 and the object. As shown in FIGS. 3A and 3B, the reflecting unit 14 is controlled by the processing unit 12 to repeatedly perform a movement at a second frequency so as to reflect the first light A or the second light B. The lens 22 includes a light penetrating portion 221 and a reflecting portion 223, and the reflecting portion 223 is disposed around the light penetrating portion 221 and is configured to reflect the first light A or the second light B. Besides, the first light A or the second light B is focused by the light penetrating portion 221.

In addition, a baseline C passes through the object, the light penetrating portion 221 and the reflecting unit 14, and an axis D passes through the reflecting unit 14. Whenever the reflecting unit 14 performs the movement, the axis D is oriented at a first angle α or a second angle β with respect to the baseline C.

The processing unit 12 is configured to adjust an angle between the axis D and the baseline C by controlling an amount of current (that is, the processing unit 12 is configured to adjust an angle and a direction of the reflecting unit 14). As shown in FIG. 3A, when the light emitter 18 emits the first light A, the reflecting unit 14 is rotated by the processing unit 12 to face a first direction capable of receiving the first light A (that is, the processing unit 12 orients the axis D at the first angle α with respect to the baseline C). The first light A emitted by the light emitter 18 is sequentially reflected by the reflecting portion 223 and the reflecting unit 14 and travels along the baseline C, through the light penetrating portion 221 and to the object. As shown in FIG. 3B, when the second light B obtained from a reflection of the first light A by the object travels to the distance measuring module 10, the reflecting unit 14 is rotated by the processing unit 12 to face a second direction capable of receiving the second light B (that is, the processing unit 12 orients the axis D at the second angle β with respect to the baseline C). The second light B travels along the baseline C, through the light penetrating portion 221 and to the reflecting unit 14 and is sequentially reflected by the reflecting unit 14 and the reflecting portion 223 to the light receiver 20. The light receiver 20 receives the second light B, transforms light to a first signal and outputs the first signal to the processing unit 12. The processing unit 12 receives the first signal and calculates the distance between the distance measuring module 10 and the object. According to the above described structure, receiving and emitting systems are integrated with each other in the distance measuring module 10. Thus, the volume and manufacturing cost of the distance measuring module 10 can be reduced. In present embodiment, a sum of the first angle α and the second angle β is in the range of 92±5% degrees (that is, approximately from 87.4 degrees to 96.6 degrees) or even in the range of S±5% degrees where S is greater than 92 when it is required in accordance the practical application. Further, the sum of the first angle α and the second angle β approximately equals to a penetrable angle of the light penetrating portion 21. In present embodiment, the first angle α equals to the second angle β, and the first angle α ranges from 0 degrees to 46 degrees wherein the first angle α is 0 degrees when the reflecting unit 14 is perpendicular to a line constituted by a central point of the reflecting unit 14 and the object. In general, transmission of light is extremely fast and therefore the travelling time of light is not taken into consideration when the second frequency is determined. However, when the distance measuring module 10 operates in the outer space (for example, the distance measuring module 10 is disposed in a satellite for scanning topography of an area on the earth), the distance between the distance measuring module 10 and the object is far enough so that the traveling time of the light is necessarily taken into consideration. Thus, when the second light B reaches the distance measuring module 10 in the outer space by reflection of the object on the earth, the reflecting unit 14 may have swung away from the predetermined orientation so that the first angle α does not equal to the second angle β. Under such a circumstance, software can be provided for calibration so that the measured distance coincides with the actual distance.

In present embodiment, the first light A or the second light B is invisible light, the reflecting unit 14 is a MEMS (Micro Electro Mechanical System) mirror, the light emitter 18 is a laser diode and the light receiver 20 is an avalanche photodiode (APD).

Figure 4:
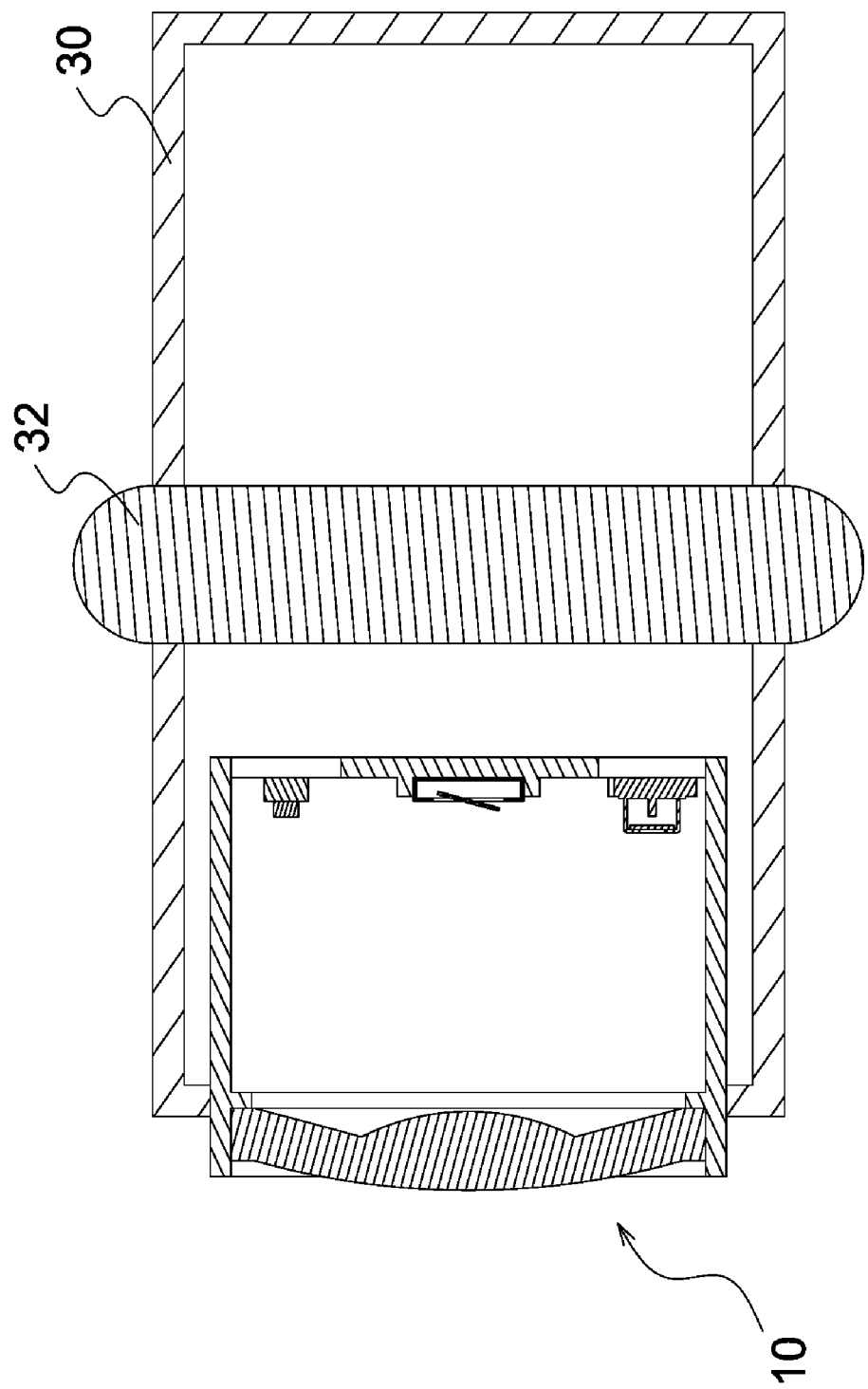
FIG. 4 is a sectional view of the distance measuring module of the FIG. 3B disposed in a cylindrical housing.

Referring to FIG. 4, in a second embodiment, the above described distance measuring module 10 is disposed in a cylindrical housing 30 of an apparatus (not shown). The cylindrical housing 30 includes a shaft 32, and the distance measuring module 10 can be rotated around the shaft 32. Specifically, the apparatus (such as a robot vacuum) is placed in a space (such as a room) and is actuated to rotate the distance measuring module 10 around the shaft 32. During rotation, the distance measuring module 10 emits the first light A and receives the second light B for calculating the distances between the distance measuring module 10 and a plurality of objects (such as furniture) in the space so as to construct a model of the space. It is worth noting that if the reflecting unit 14 is a MEMS mirror, then the second frequency at which the MEMS mirror swings will be high enough to produce at least forty thousand data points per second, and therefore the distances between the distance measuring module 10 and the objects in the space can be obtained quickly. Meanwhile, if the light emitter 18 is a laser diode, then the first frequency (such as 4096 Hz) at which the laser diode emits the first light A will be at least twice of the second frequency (such as 1150 Hz) at which the MEMS mirror swings. That is, emitting the first light A is more frequent than swinging the reflecting unit 14. During the swing of the MEMS mirror, part of the first light A is still reflected to the MEMS mirror by the reflecting portion 223 and then reflected to the objects surrounding the distance measuring module 10 by the MEMS mirror so as to continuously perform the scan. The greater a ratio of the first frequency to the second frequency is, the higher the accuracy of scan is. Further, some known laser diodes are able to repeatedly emit light at the frequency of 200,000 Hz at most, while others at the frequency of 2,500 Hz at least. In other words, the ratio of the first frequency to the second frequency ranges from 2 to 20 (or the first frequency is two to twenty times of the second frequency).

Figure 5:
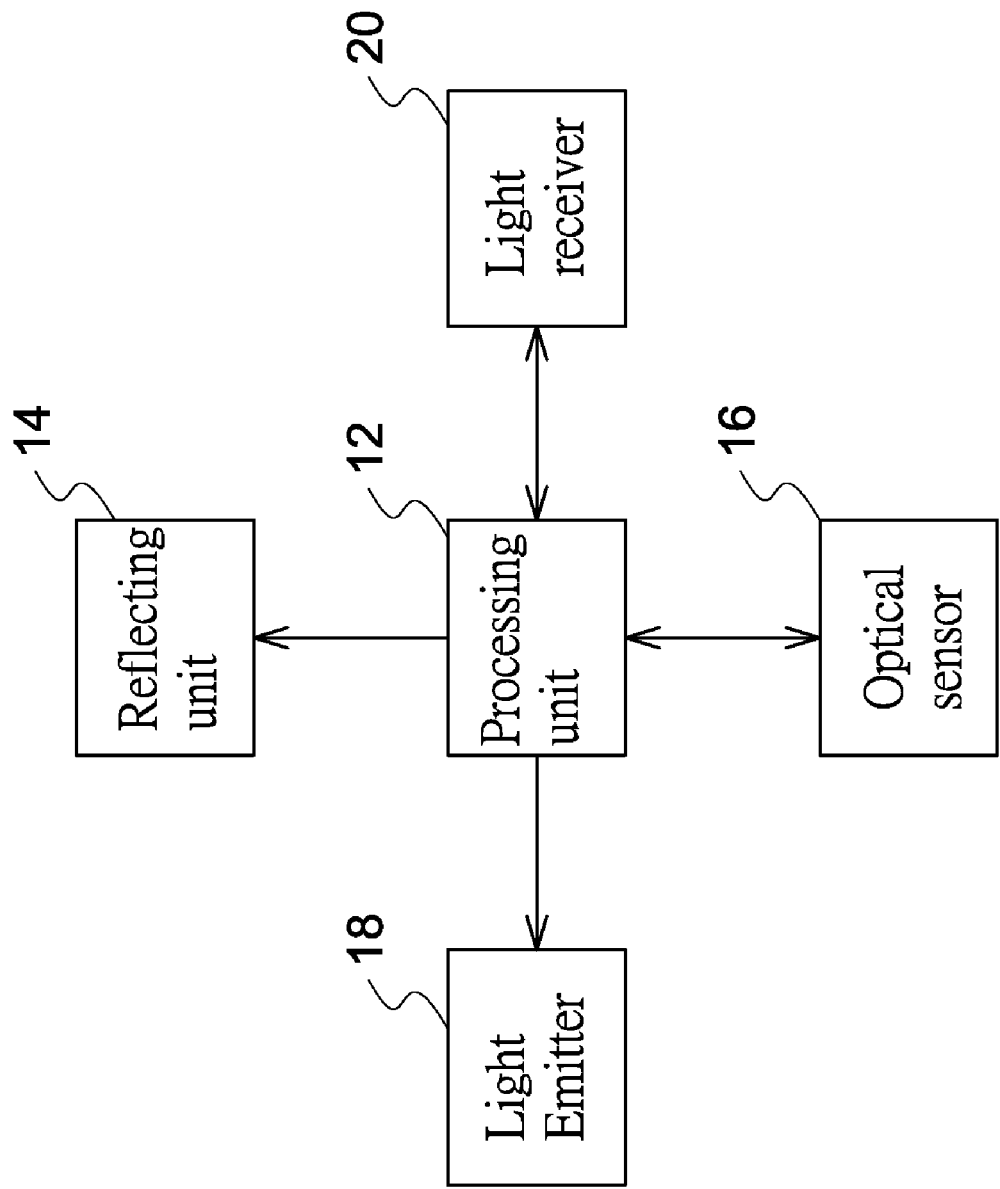
FIG. 5 is a block diagram of a distance measuring module in accordance with a third embodiment of the invention.

In a third embodiment, the distance measuring module 10 is integrated with a telephoto lens system for observing an object so that the user can observe an image of the object during a measurement of distance. Referring to FIG. 5, a distance measuring module 10 in accordance with the third embodiment of the invention includes a processing unit 12, a reflecting unit 14, an optical sensor 16, a light emitter 18, a light receiver 20 and a lens 22.

The optical sensor 16 is disposed on the above described observation plane 28 (as shown in FIGS. 3A and 3B). If an observation is made in a direction from the object to the distance measuring module 10 along the baseline C, then the optical sensor 16, the light emitter 18 and the light receiver 20 are triangularly located around the reflecting unit 14. Similarly, the reflecting unit 14 is controlled by the processing unit 12 to perform a movement and is configured to reflect the first light A, the second light B or third light (not shown) emitted by the object. The processing unit 12 is connected to the optical sensor 16, and the optical sensor 16 is configured to receive the third light and provide the image of the object for the processing unit 12.

It is worth noting that the optical path of the third light is similar to the optical path of the above described second light B (as shown in FIG. 3B). Specifically, when the object emits the third light, the reflecting unit 14 is rotated by the processing unit 12 to face a third direction capable of receiving the third light (that is, the processing unit 12 orients the axis D at a third angle (not shown) with respect to the baseline C). The third light travels along the baseline C, through the light penetrating portion 221 and to the reflecting unit 14 and is sequentially reflected by the reflecting unit 14 and the reflecting portion 223 to the optical sensor 16. The optical sensor 16 receives the third light, transforms light to a second signal and outputs the second signal to the processing unit 12. The processing unit 12 receives and processes the second signal to obtain the image of the object. By such arrangement, the user can observe the object through an eyepiece unit (not shown) or a display unit (not shown). The arrangement of other elements and operation of the embodiment are similar to those of the embodiments described above, and therefore the descriptions thereof are omitted.

In the third embodiment, the third light is visible light, and the optical sensor 16 is a charge coupled device (CCD).

In a fourth embodiment, the object is in a low-light environment (for example, in a tunnel), and the third light is infrared light (that is, invisible light). The optical path of the infrared light from the object to the optical sensor is similar to that of the third light of the third embodiment. The infrared light may be emitted by the object itself, or reflected by the object to the distance measuring module when the infrared light is generated and directed by the distance measuring module (or another device) to the object. By such arrangement, the user can observe an image of the object in the low-light environment during a measurement of distance. The arrangement of other elements and operation of the embodiment are similar to those of the third embodiments described above, and therefore the descriptions thereof are omitted.

The distance measuring module 10 of the invention has the reflecting unit 14 disposed at an intersection of the optical emitting path and the optical receiving path. By such an arrangement, the receiving system and the emitting system are integrated with each other. Therefore, the volume, weight, and the manufacturing cost of the distance measuring module 10 can be reduced. Besides, the distance measuring module 10 can be included in an apparatus for omnibearing distance measurement (such as robot vacuums, vehicles with automatic pilot, or car steering assistance using light detection and ranging (LIDAR) or reversing radar) so as to construct the model of the surrounding space of the apparatus quickly.

What is claimed is:

1. A distance measuring module, comprising:
   a light emitter configured to emit first light, wherein an object reflects the first light to form second light;
   a reflecting unit configured to perform a movement to reflect the first light or the second light; and
   a light receiver configured to receive the second light for calculating a distance between the distance measuring module and the object;
   wherein a baseline passes through the object and the reflecting unit, an axis passes through the reflecting unit, and the axis is oriented at a first angle or a second angle with respect to the baseline when the reflecting unit performs the movement;
   wherein when the light emitter emits the first light, the axis is oriented at the first angle with respect to the baseline so that the first light is reflected by the reflecting unit along the baseline to the object;
   wherein when the second light from the object is directed to the distance measuring module, the axis is oriented at the second angle with respect to the baseline so that the second light travels along the baseline to the reflecting unit, and is reflected to the light receiver by the reflecting unit.

2. The distance measuring module as claimed in claim 1, further comprising a lens which comprises a light penetrating portion;
   wherein the first light travels along the baseline, through the light penetrating portion and to the object;
   wherein the second light travels along the baseline, through the light penetrating portion and to the reflecting unit.

3. The distance measuring module as claimed in claim 2, wherein the light penetrating portion is configured to focus light.

4. The distance measuring module as claimed in claim 2, wherein the lens further comprises a reflecting portion disposed around the light penetrating portion;
   wherein the first light is sequentially reflected by the reflecting portion and the reflecting unit to the object;
   wherein the second light is sequentially reflected by the reflecting unit and the reflecting portion to the light receiver.

5. The distance measuring module as claimed in claim 2, wherein a sum of the first angle and the second angle substantially equals to a penetrable angle of the light penetrating portion.

6. The distance measuring module as claimed in claim 5, wherein the sum of the first angle and the second angle ranges from 87.4 degrees to 96.6 degrees.

7. The distance measuring module as claimed in claim 6, wherein the first angle ranges from 0 degrees to 46 degrees.

8. The distance measuring module as claimed in claim 1, further comprising a processing unit connected to the light emitter, the reflecting unit and the light receiver;
   wherein the processing unit is configured to control the light emitter to repeatedly emit the first light at a first frequency;
   wherein the processing unit is configured to control the reflecting unit to repeatedly perform the movement at a second frequency so that the axis is oriented at the first angle or the second angle with respect to the baseline;
   wherein the light receiver is configured to receive the second light and output a first signal to the processing unit, and the processing unit is configured to receive the first signal and calculate the distance between the distance measuring module and the object.

9. The distance measuring module as claimed in claim 8, wherein the first frequency is at least twice of the second frequency.

10. The distance measuring module as claimed in claim 9, wherein the first frequency is at least two to twenty times of the second frequency.

11. The distance measuring module as claimed in claim 10, wherein the light emitter repeatedly emits the first light at the first frequency ranging from 2,500 Hz to 200,000 Hz.

12. The distance measuring module as claimed in claim 1, wherein the first light or the second light is invisible light.

13. The distance measuring module as claimed in claim 1, further comprising an optical sensor configured to receive third light travelling from the object to the distance measuring module;
   wherein when the third light travels from the object to the distance measuring module, the axis is oriented at a third angle with respect to the baseline so that the third light travels along the baseline and to the reflecting unit, and is reflected to the optical sensor by the reflecting unit.

14. The distance measuring module as claimed in claim 13, wherein the third light is visible light.

15. The distance measuring module as claimed in claim 13, wherein the third light is invisible light.

16. The distance measuring module as claimed in claim 15, wherein the third light is infrared light.

17. The distance measuring module as claimed in claim 1, wherein the reflecting unit is a MEMS (Micro Electro Mechanical System) mirror.

* * * * *